United States Patent [19]
Fiedler et al.

[11] Patent Number: 5,329,775
[45] Date of Patent: Jul. 19, 1994

[54] CRYOGENIC HELIUM PRODUCTION SYSTEM

[75] Inventors: Brian C. Fiedler, East Amherst; James J. Maloney, Tonawanda; James R. Handley, East Amherst, all of N.Y.

[73] Assignee: Praxair Technology, Inc., Danbury, Conn.

[21] Appl. No.: 985,982

[22] Filed: Dec. 4, 1992

[51] Int. Cl.$^5$ ............................................. F25J 3/02
[52] U.S. Cl. ...................................... 62/24; 62/22; 62/31; 62/40; 62/11
[58] Field of Search .................. 62/11, 22, 24, 31, 40

[56] References Cited

U.S. PATENT DOCUMENTS

| | | | |
|---|---|---|---|
| 3,355,902 | 12/1967 | Crawford et al. | 62/28 |
| 3,740,962 | 6/1973 | Fan | 62/23 X |
| 3,797,261 | 3/1974 | Juncker et al. | 62/40 |
| 3,813,889 | 6/1974 | Allam et al. | 62/22 |
| 3,815,376 | 6/1974 | Lofredo et al. | 62/24 X |
| 3,992,167 | 11/1976 | Beddome | 62/23 X |
| 4,274,850 | 6/1981 | Becker | 62/24 |
| 4,664,686 | 5/1987 | Pahade et al. | 62/24 |
| 4,701,200 | 10/1987 | Fisher et al. | 62/27 |
| 4,701,201 | 10/1987 | Hanson et al. | 62/27 |
| 4,758,258 | 6/1988 | Mitchell et al. | 62/25 |
| 4,805,413 | 2/1989 | Mitchell et al. | 62/31 X |
| 4,952,305 | 8/1990 | Kummann | 62/31 X |
| 5,011,521 | 4/1991 | Gottier | 62/11 |
| 5,017,204 | 5/1991 | Gottier et al. | 62/11 |

OTHER PUBLICATIONS $N_2$ Removal From Natural Gas, Streich, Hydrocarbon Processing. Apr., 1970.

Primary Examiner—Henry A. Bennett
Assistant Examiner—C. Kilner
Attorney, Agent, or Firm—Stanley Ktorides

[57] ABSTRACT

A cryogenic helium production system wherein a feed which includes carbon dioxide is processed in a dual temperature system including an upstream higher temperature and higher pressure column or dephlegmator, thus eliminating the need for a separate non-cryogenic carbon dioxide removal step.

16 Claims, 3 Drawing Sheets

CRYOGENIC HELIUM PRODUCTION SYSTEM

TECHNICAL FIELD

This invention relates to the production of crude helium by the cryogenic processing of a hydrocarbon stream which also contains carbon dioxide.

BACKGROUND ART

Helium is generally produced by separation from a natural gas stream. An often used method for carrying out the separation is cryogenic processing.

Typically carbon dioxide is also present in the natural gas along with the helium. If cryogenic processing is to be employed to separate the helium from the natural gas to produce crude helium, it has heretofore generally been necessary to remove the carbon dioxide from the natural gas prior to the cryogenic processing. This is because at the low temperatures which cryogenic processing operates to produce crude helium, the carbon dioxide will freeze and plug or otherwise foul the processing equipment. Examples of carbon dioxide removal upstream of such cryogenic processing include contacting the feed with a liquid such as certain amines and/or passing the feed through molecular sieve beds for adsorption of the carbon dioxide. Such pretreatment systems increase both the capital and operating costs of a crude helium production system.

Accordingly it is an object of this invention to provide a cryogenic helium production system which can process a feed stream containing helium, hydrocarbon and carbon dioxide without need for a separate carbon dioxide removal step upstream of the cryogenic processing.

As mentioned, the helium is found with natural gas and the hydrocarbon is preferably recovered in addition to the helium. Typically the hydrocarbon is recovered at a relatively low pressure from the cryogenic separation and then compressed to higher levels for pipeline transmission. The relatively low pressure is the result of the cryogenic processing which operates more efficiently at lower pressures. However, it would be desirable to have a cryogenic processing system for producing crude helium which can also produce at least some hydrocarbon at higher pressure thus reducing compression requirements and therefore reducing costs.

SUMMARY OF THE INVENTION

The above and other objects which will become apparent to one skilled in the art upon a reading of this disclosure are attained by the present invention one aspect of which is:

A cryogenic rectification method for producing crude helium comprising:

(A) cooling a feed comprising helium, hydrocarbon and carbon dioxide to a temperature sufficient to cool but not to freeze carbon dioxide in the feed;

(B) passing cooled feed into a column and separating the feed within the column by cryogenic rectification into a helium-enriched fluid and a first residue fluid;

(C) warming first residue fluid by indirect heat exchange with feed to cool the feed;

(D) partially condensing helium-enriched fluid taken from the column to produce crude helium vapor and a second residue fluid;

(E) warming second residue fluid by indirect heat exchange with partially condensing helium-enriched fluid;

(F) condensing vapor from the column by indirect heat exchange with second residue fluid and providing resulting liquid to the column; and (G) recovering crude helium vapor as product crude helium.

Another aspect of the invention is:

Apparatus for producing crude helium comprising:

(A) a higher temperature heat exchanger, a cryogenic rectification column having a condenser, and means for passing feed from the higher temperature heat exchanger into the cryogenic rectification column;

(B) a lower temperature heat exchanger and means for passing fluid from the upper portion of the cryogenic rectification column to the lower temperature heat exchanger;

(C) means for passing fluid from the lower portion of the cryogenic rectification column to the higher temperature heat exchanger;

(D) a phase separator and means for passing fluid from the lower temperature heat exchanger to the phase separator;

(E) means for passing fluid from the liquid side of the phase separator to the lower temperature heat exchanger;

(F) means for passing fluid from the low temperature heat exchanger to the condenser; and (G) means for recovering fluid taken from the vapor side of the phase separator.

A further aspect of the invention is:

A cryogenic separation method for producing crude helium comprising:

(A) cooling a feed comprising helium, hydrocarbon and carbon dioxide to a temperature sufficient to cool but not to freeze carbon dioxide in the feed;

(B) passing cooled feed into a separation system comprising a dephlegmator and separating the feed within the separation system into a helium-enriched fluid and a first residue fluid;

(C) warming first residue fluid by indirect heat exchange with feed to cool the feed;

(D) partially condensing helium-enriched fluid taken from the dephlegmator to produce crude helium vapor and a second residue fluid;

(E) warming second residue fluid by indirect heat exchange with partially condensing helium-enriched fluid;

(F) condensing vapor within the dephlegmator by indirect heat exchange with second residue fluid;

(G) recovering crude helium vapor as product crude helium.

Still another aspect of the invention is:

Apparatus for producing crude helium comprising:

(A) a higher temperature heat exchanger, a separation system comprising a dephlegmator, and means for passing feed from the higher temperature heat exchanger into the separation system;

(B) a lower temperature heat exchanger and means for passing fluid from the dephlegmator to the lower temperature heat exchanger;

(C) means for passing fluid from the separation system to the higher temperature heat exchanger;

(D) a phase separator and means for passing fluid from the lower temperature heat exchanger to the phase separator;

(E) means for passing fluid from the liquid side of the phase separator to the lower temperature heat exchanger;

(F) means for passing fluid from the lower temperature heat exchanger to the dephlegmator; and (G) means for recovering fluid taken from the vapor side of the phase separator.

As used herein, the term "phase separator" means a device in which a two phase fluid separates into vapor and liquid at the vapor side and liquid side respectively.

As used herein the term "recovery" means removal from the process, examples of which include product recovery and release to the atmosphere.

The term "column" as used herein means a distillation column or zone, i.e., a contacting column or zone wherein liquid and vapor phases are countercurrently contacted to effect separation of a fluid mixture, as for example, by contacting of the vapor and liquid phases on packing elements and/or on a series of vertically spaced trays or plates mounted within the column. For a further discussion of distillation columns see the Chemical Engineer's Handbook, Fifth Edition, edited by R. H. Perry and C. H. Chilton, McGraw-Hill Book Company, New York, Section 13, "Distillation" B. D. Smith, et al., page 13-3 *The Continuous Distillation Process.*

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase.

Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns.

Another mass transfer process that can be utilized to separate a gas mixture is dephlegmation which involves the indirect cooling and partial condensation of an upwardly flowing vapor in contact with the downwardly flowing liquid. The mass transfer between the rising vapor and falling liquid results in concentrating the volatile component(s) in the vapor phase and the less volatile component(s) in the liquid phase. The necessary indirect cooling for the dephlegmator is typically provided by pressure reduction and boiling of the separated liquid, but can be provided by external means such as another process stream. The dephlegmator apparatus can be suitable tube and shell or plate and fin heat exchanger or the like. Further description of dephlegmation is given in the Separation of Gases by M. Ruhemann, Oxford University Press 1949, Chapter III, The Methods of Gas Separation. It should be noted that "dephlegmators" are similar to and sometimes termed "reflux condensers".

Cryogenic rectification or separation is carried out, at least in part, at low temperatures such as at or below $-100°$ F.

The term "indirect heat exchange" as used herein means the bringing of two fluid streams into heat exchange relation without any physical contact or intermixing of the fluids with each other.

As used herein the terms "upper portion" and "lower portion" of a column mean the upper half and the lower half respectively of the column.

As used herein the term "crude helium" means a fluid containing at least 50 mole percent helium.

DETAILED DESCRIPTION

The invention is a cryogenic helium production system which operates at two temperatures regions, an upstream higher temperature region and a downstream lower temperature region. The higher temperature region enables the removal of most of the carbon dioxide in the feed by cryogenic rectification or dephlegmation thus eliminating the need for a separate non-cryogenic carbon dioxide removal step. The final separation is carried out at the downstream lower temperature region to effectively produce crude helium. The dual temperature region system also enables the recovery of a higher pressure hydrocarbon stream from the cryogenic rectification.

Figure 1:
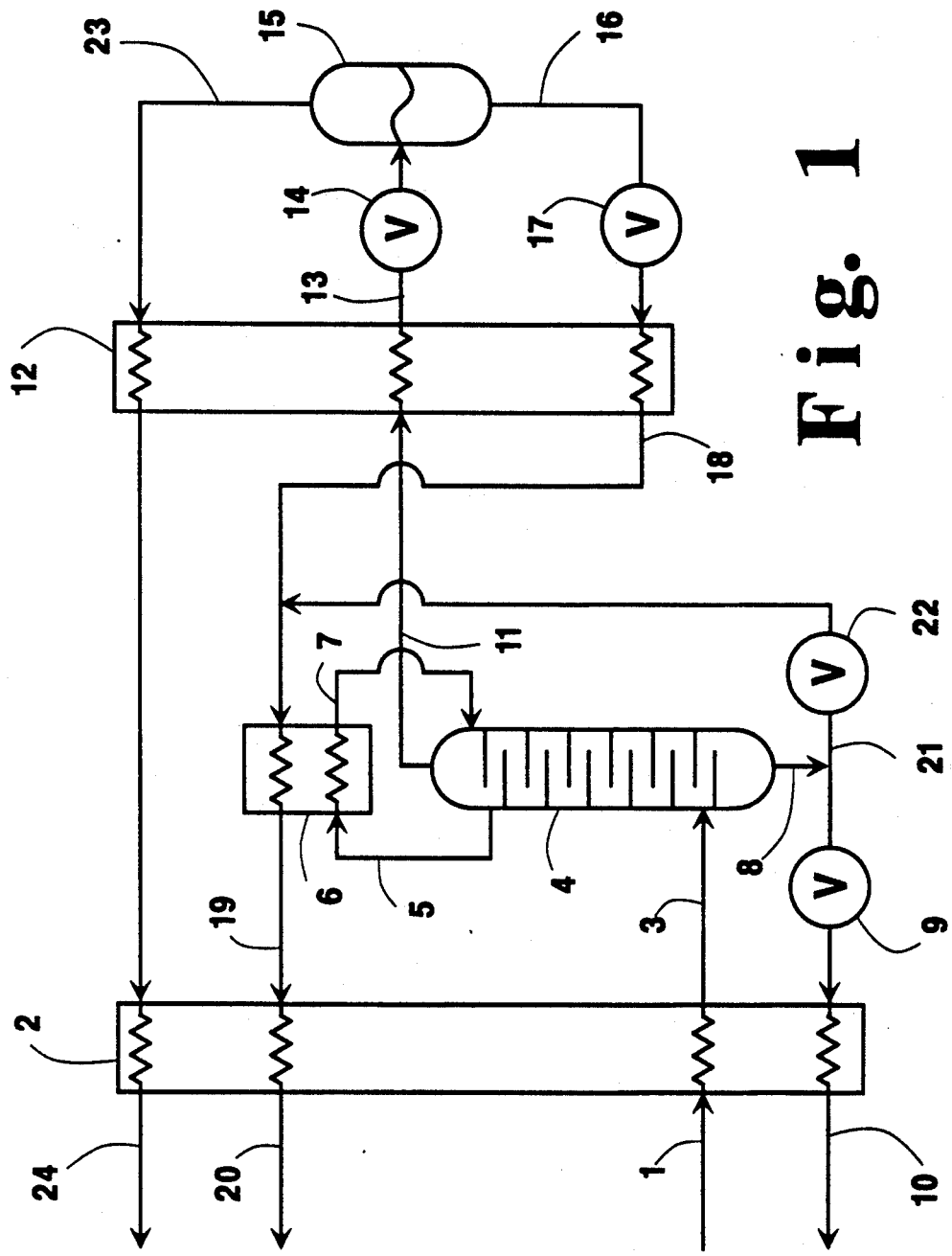
FIG. 1 is a schematic representation of one embodiment of the cryogenic helium production system of this invention.

The invention will be described in detail with reference to the Drawings. Referring now to FIG. 1, feed 1, generally at a pressure within the range of from 200 to 1000 pounds per square inch absolute (psia), is cooled by passage through higher temperature heat exchanger 2 by indirect heat exchange with one or more return streams as will be described more fully later. Feed 1 contains helium, carbon dioxide and hydrocarbon. The hydrocarbon will include methane and may include one or more heavier hydrocarbons such as the ethane and propane. The feed will also generally contain nitrogen. Helium is present in the feed generally at a concentration within the range of from 0.1 to 5.0 mole percent. Carbon dioxide is present in the feed generally at a concentration up to 1.0 mole percent. The balance of the feed comprises hydrocarbon and nitrogen.

The feed is cooled by passage through higher temperature heat exchanger 2 to a temperature within the range of from $-250°$ F. to $-50°$ F. At this temperature some of the feed including some carbon dioxide may condense. However, the temperature is not so low as to enable carbon dioxide in the feed to freeze. The cooled feed 3 is then passed into cryogenic rectification column 4, generally operating at a pressure within the range of from 200 to 600 psia, wherein it is separated by cryogenic rectification into a helium-enriched fluid and a first residue fluid. In the embodiment illustrated in FIG. 1, cryogenic rectification column 4 is a stripping column wherein heavier components in upflowing vapor are stripped out by descending liquid. The descending liquid is generated by at least partially condensing a vapor stream 5 from the upper portion of column 4 by passage through condenser 6 and returning resulting fluid 7 back into column 4. Condenser 6 may be physically outside column 4, as illustrated in the Figure, or it may be within the upper portion of column 4.

First residue fluid comprises primarily hydrocarbon and nitrogen, if nitrogen is present in the feed, and also contains most of the carbon dioxide which was present in the feed. First residue fluid is removed from the lower portion of column 4 as stream 8, passed through valve 9 and warmed within higher temperature heat exchanger 2 wherein it serves to provide refrigeration to cool the feed. The resulting warmed first residue fluid may be recovered as stream 10 at an elevated pressure thus reducing hydrocarbon stream compression requirements if compression is desired.

Helium-enriched fluid, generally having a helium concentration within the range of from 0.3 to 15.0 mole percent, is withdrawn from the upper portion of column 4 as stream 11 and passed through lower temperature heat exchanger 12 wherein it is partially condensed at a temperature generally not more than −50° F. Because most of the carbon dioxide in the feed was removed by the upstream higher temperature processing, the small amount of carbon dioxide remaining in the helium-enriched fluid remains soluble during the downstream lower temperature processing. The carbon dioxide concentration in the helium-enriched fluid will be low enough to prevent freezing of the carbon dioxide in the cold end of the process. Although the carbon dioxide concentration is dependent on the particular process conditions, it will generally be less than 10 parts per million (ppm). The two phase stream 13 exiting lower temperature heat exchanger 12 is reduced in pressure through valve 14 and then passed into phase separator 15 wherein it is separated into crude helium vapor and a second residue fluid.

Second residue fluid comprises primarily hydrocarbon and nitrogen and also contains essentially all of the remaining carbon dioxide, if any, that was not removed with the first residue fluid. Second residue fluid is removed from the lower half or liquid side of phase separator 15 as liquid steam 16, passed through valve 17 and warmed by indirect heat exchange with the partially condensing helium-enriched fluid in lower temperature heat exchanger 12.

Warmed second residue fluid 18 is then passed through condenser 6 wherein it is further warmed by indirect heat exchange with vapor 5 to partially condense the vapor and provide liquid in line 7 to drive column 4. Resulting further warmed second residue fluid 19 is preferably passed through higher temperature heat exchanger 2 to assist in the cooling of the feed and the resulting second residue fluid 20 may be recovered as a lower pressure hydrocarbon stream.

If desired, and as illustrated in FIG. 1, a portion 21 of first residue fluid 8 may be passed through valve 22 and combined with stream 18 to assist in the condensation of vapor in condenser 6 to drive column 4.

Crude helium vapor is withdrawn from the upper half or vapor side of phase separator 15 as stream 23 and recovered as product crude helium. Preferably, as illustrated in FIG. 1, crude helium vapor stream 23 is warmed by passage through lower temperature heat exchanger 12 and higher temperature heat exchanger 2 to assist respectively in the partial condensation of helium-enriched fluid and the cooling of the feed. The resulting crude helium vapor is recovered as stream 24. The recovery of helium in the crude vapor product will generally be at least 95 percent of the helium in the feed.

For illustrative purposes a computer simulation of the invention was carried out with the embodiment of the invention illustrated in FIG. 1. Results of this computer simulation are listed in Table 1. The stream numbers in Table 1 correspond to those of FIG. 1.

TABLE 1

|  | 1 | 24 | 10 | 20 |
|---|---|---|---|---|
| Flow Rate, lb mol/hr | 1000 | 14 | 640 | 346 |
| Temperature, °F. | 120 | 117 | 117 | 117 |
| Pressure, psia | 264 | 144 | 198 | 76 |
| Composition, mole % |  |  |  |  |
| Helium | 1.00 | 70.00 | 201 ppm | 0.11 |
| Carbon Dioxide | 0.17 | — | 0.27 | 5 ppm |
| Nitrogen | 32.36 | 29.20 | 16.60 | 61.59 |
| Methane | 64.17 | 0.80 | 79.52 | 38.30 |
| Ethane | 0.84 | — | 1.31 | — |
| Propane | 1.01 | — | 1.58 | — |
| i-Butane | 0.12 | — | 0.19 | — |
| n-Butane | 0.25 | — | 0.40 | — |
| Pentanes + | 0.08 | — | 0.11 | — |

Figure 2:
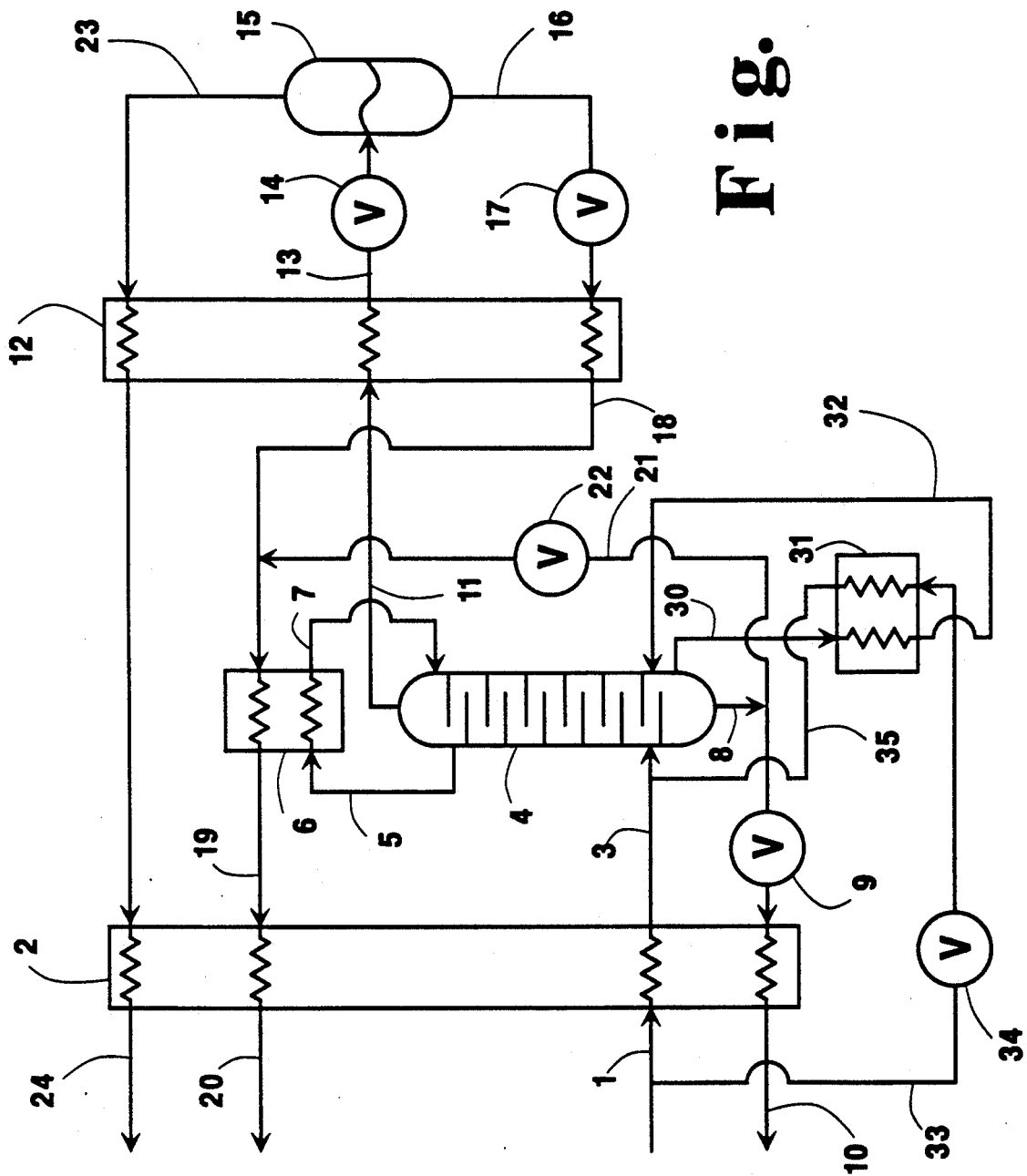
FIG. 2 is schematic representation of another embodiment of the invention wherein a reboiler is used in conjunction with a cryogenic rectification column.

FIG. 2 illustrates another embodiment of the invention wherein a reboiler is added to the column and a small amount of warm feed gas is used to provide reboil for the column; The reboiler helps drive helium and nitrogen from the liquid phase, increases the helium recovery and improves the quality of the residue fluid. The reboiler may be outside the column as illustated in FIG. 2 or it may be within the column. The numerals in FIG. 2 correspond to those of FIG. 1 for the common elements, and these common elements will not be described again in detail. Referring now to FIG. 2, liquid 30 from the lower portion of column 4 is passed through reboiler 31 wherein it is vaporized and passed back into column 4 as stream 32 to provide upflowing vapor to the column. A portion 33 of warm feed 1 is passed through valve 34 and through reboiler 32 wherein it serves to vaporize liquid 30 by indirect heat exchange. The resulting cooled fluid 35 is then passed into column 4 such as by combining with stream 3 as illustrated in FIG. 2.

Figure 3:
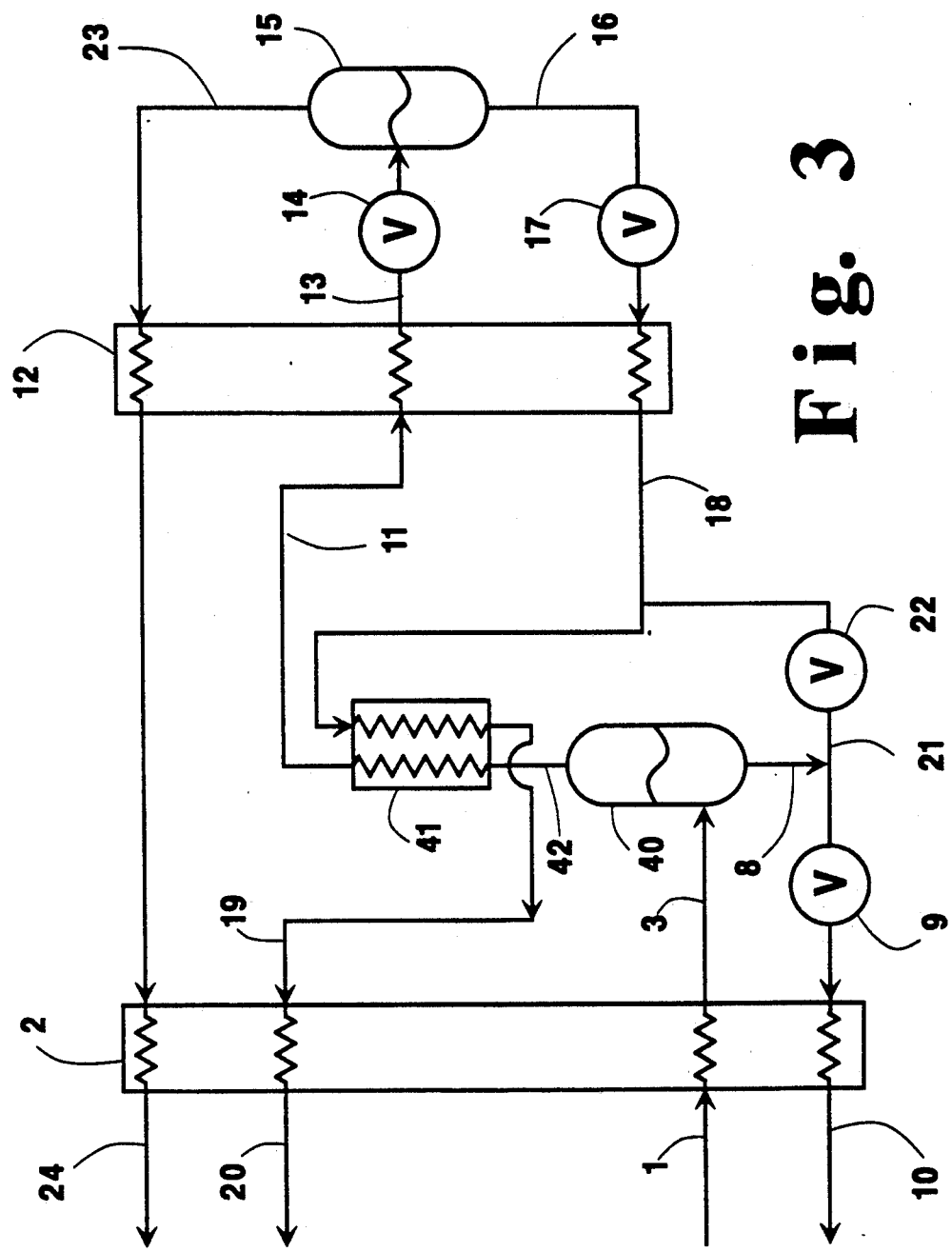
FIG. 3 is a schematic representation of another embodiment of the invention wherein a separation system employing a dephlegmator is used rather than a column.

FIG. 3 illustrates another embodiment of the invention wherein a separation system comprising a dephlegmator and a separation vessel is used rather than the column and top condenser combination used with the embodiments illustrated in FIGS. 1 and 2. This arrangement may be preferred if there is little liquid available for use in the column. The numerals in FIG. 3 correspond to those in FIG. 1 for the common elements and these common elements will not be described again in detail. Referring now to FIG. 3, feed 3 is passed into separation vessel 40 of a separation system which also comprises dephlegmator 41. Vapor from the upper half of separation vessel 40 passes in line 42 into dephlegmator 41 wherein it is partially condensed by indirect heat exchange with second residue fluid 18 and, if desired, first residue fluid 21 taken from the lower half of separation vessel 40. The condensed portion of the vapor passed into dephlegmator 41 is passed back into phase separator or separation vessel 40 through line 42 wherein it forms first residue fluid which is passed out of separation vessel 40 as stream 8 for further processing as previously described. Helium-enriched vapor is passed out of dephlegmator 41 as stream 11 and passed to low temperature heat exchanger 12 for further processing as previously described.

Now by the use of this invention one can produce crude helium by the cryogenic processing of feed which also contains carbon dioxide without requiring a separate non-cryogenic carbon dioxide removal step upstream of the cryogenic processing. Although the invention has been described in detail with reference to certain preferred embodiments, those skilled in the art will recognize that there are other embodiments of the invention within the spirit and the scope of the claims. For example, first residue fluid withdrawn from the cryogenic rectification column may be expanded through a liquid turbine enabling a higher pressure residue to be produced and/or allowing a larger fraction of the residue to be produced at a first residue pressure rather than a second residue pressure. In another embodiment liquid from phase separator 15 may be flashed to a lower pressure, phase separated in another phase separator, and the resulting vapor combined with the vapor stream withdrawn from phase separator 15 to increase helium recovery. Still further, the first residue fluid that is throttled may be expanded in a turboexpander, which may be generator loaded or compressor loaded with the power being used to generate electricity or compress one of the product streams or the feed stream.

We claim:

1. A cryogenic rectification method for producing crude helium comprising:
   (A) cooling a feed comprising helium, hydrocarbon and carbon dioxide to a temperature sufficient to cool but not to freeze carbon dioxide in the feed;
   (B) passing cooled feed into a column and separating the feed within the column by cryogenic rectification into a helium-enriched fluid and a first residue fluid;
   (C) warming first residue fluid by indirect heat exchange with feed to cool the feed;
   (D) partially condensing helium-enriched fluid taken from the column to produce crude helium vapor and a second residue fluid;
   (E) warming second residue fluid by indirect heat exchange with partially condensing helium-enriched fluid;
   (F) condensing vapor from the column by indirect heat exchange with second residue fluid and providing resulting liquid to the column; and
   (G) recovering crude helium vapor as product crude helium.

2. The method of claim 1 further comprising passing crude helium vapor in indirect heat exchange with partially condensing helium-enriched fluid.

3. The method of claim 1 further comprising passing crude helium vapor in indirect heat exchange with cooling feed.

4. The method of claim 1 further comprising passing second residue fluid in indirect heat exchange with cooling feed.

5. The method of claim 1 further comprising vaporizing liquid from the lower portion of the cryogenic rectification column by indirect heat exchange with a portion of the feed, and thereafter passing the resulting vapor and said feed portion into the cryogenic rectification column.

6. Apparatus for producing crude helium comprising:
   (A) a higher temperature heat exchanger, a cryogenic rectification column having a condenser, and means for passing feed from the higher temperature heat exchanger into the cryogenic rectification column;
   (B) a lower temperature heat exchanger and means for passing fluid from the upper portion of the cryogenic rectification column to the lower temperature heat exchanger;
   (C) means for passing fluid from the lower portion of the cryogenic rectification column to the higher temperature heat exchanger;
   (D) a phase separator and means for passing fluid from the lower temperature heat exchanger to the phase separator;
   (E) means for passing fluid from the liquid side of the phase separator to the lower temperature heat exchanger;
   (F) means for passing fluid from the lower temperature heat exchanger to the condenser; and
   (G) means for recovering fluid taken from the vapor side of the phase separator.

7. The apparatus of claim 6 further comprising means for passing fluid from the condenser to the higher temperature heat exchanger.

8. The apparatus of claim 6 wherein the means for recovering fluid taken from the vapor side of the phase separator include means for passing fluid from the vapor side of the phase separator to the lower temperature heat exchanger and means for passing fluid from the lower temperature heat exchanger to the higher temperature heat exchanger.

9. The apparatus of claim 6 further comprising a reboiler for the column and means for passing feed to the reboiler and from the reboiler to the column.

10. A cryogenic separation method for producing crude helium comprising:
    (A) cooling a feed comprising helium, hydrocarbon and carbon dioxide to a temperature sufficient to cool but not to freeze carbon dioxide in the feed;
    (B) passing cooled feed into a separation system comprising a dephlegmator and separating the feed within the separation system into a helium-enriched fluid and a first residue fluid;
    (C) warming first residue fluid by indirect heat exchange with feed to cool the feed;
    (D) partially condensing helium-enriched fluid taken from the dephlegmator to produce crude helium vapor and a second residue fluid;
    (E) warming second residue fluid by indirect heat exchange with partially condensing helium-enriched fluid;
    (F) condensing vapor within the dephlegmator by indirect heat exchange with second residue fluid; and
    (G) recovering crude helium vapor as product crude helium.

11. The method of claim 10 further comprising passing some first residue fluid in indirect heat exchange with the condensing vapor of step (F).

12. Apparatus for producing crude helium comprising:
    (A) a higher temperature heat exchanger, a separation system comprising a dephlegmator, and means for passing feed from the higher temperature heat exchanger into the separation system;
    (B) a lower temperature heat exchanger and means for passing fluid from the dephlegmator to the lower temperature heat exchanger;

(C) means for passing fluid from the separation system to the higher temperature heat exchanger;

(D) a phase separator and means for passing fluid from the lower temperature heat exchanger to the phase separator;

(E) means for passing fluid from the liquid side of the phase separator to the lower temperature heat exchanger;

(F) means for passing fluid from the lower temperature heat exchanger to the dephlegmator; and (G) means for recovering fluid taken from the vapor side of the phase separator.

13. The apparatus of claim 12 wherein the separation system includes a separation vessel.

14. The apparatus of claim 13 further comprising means for passing fluid from the lower half of the separation vessel to the dephlegmator.

15. A cryogenic rectification method for producing crude helium comprising:

(A) cooling a feed comprising helium, hydrocarbon and carbon dioxide to a temperature sufficient to cool but not to freeze carbon dioxide in the feed;

(B) passing cooled feed into a column and separating the feed within the column by cryogenic rectification into a helium-enriched fluid and a first residue fluid;

(C) warming first residue fluid by indirect heat exchange with feed to cool the feed;

(D) partially condensing helium-enriched fluid taken from the column to produce crude helium vapor and a second residue fluid;

(E) warming second residue fluid by indirect heat exchange with partially condensing helium-enriched fluid;

(F) condensing vapor from the column by indirect heat exchange with second residue fluid and providing resulting liquid to the column;

(G) recovering crude helium vapor as product crude helium; and (H) passing some first residue fluid in indirect heat exchange with the condensing vapor of step (F).

16. Apparatus for producing crude helium comprising:

(A) a higher temperature heat exchanger, a cryogenic rectification column having a condenser, and means for passing feed from the higher temperature heat exchanger into the cryogenic rectification column;

(B) a lower temperature heat exchanger and means for passing fluid from the upper portion of the cryogenic rectification column to the lower temperature heat exchanger;

(C) means for passing fluid from the lower portion of the cryogenic rectification column to the higher temperature heat exchanger;

(D) a phase separator and means for passing fluid from the lower temperature heat exchanger to the phase separator;

(E) means for passing fluid from the liquid side of the phase separator to the lower temperature heat exchanger;

(F) means for passing fluid from the lower temperature heat exchanger to the condenser;

(G) means for recovering fluid taken from the vapor side of the phase separator; and (H) means for passing fluid from the lower portion of the column to the condenser.

* * * * *